United States Patent [19]

Farmer

[11] 4,127,739
[45] Nov. 28, 1978

[54] LEVEL MOUNT ELECTRICAL COMPONENT BRACKET

[75] Inventor: Marion R. Farmer, Germantown, Tenn.

[73] Assignee: Aluma-Form Inc., Memphis, Tenn.

[21] Appl. No.: 767,292

[22] Filed: Feb. 10, 1977

[51] Int. Cl.$^2$ ............................................. H02G 7/20
[52] U.S. Cl. .................................. 174/45 R; 211/107; 248/219.1; 248/219.3
[58] Field of Search ............... 174/40 R, 43, 44, 45 R, 174/149 R; 52/40, 697, 721; 211/107; 248/218.4, 219.1, 219.2, 219.3, 219.4; 361/332, 427

[56] References Cited

U.S. PATENT DOCUMENTS

| 1,175,077 | 3/1916 | Peirce, Jr. .................... | 174/45 R |
| 1,908,758 | 5/1933 | Hendee ......................... | 174/40 R |
| 2,058,611 | 10/1936 | Merkle ........................ | 248/219.3 |
| 3,254,270 | 5/1966 | Aungst ....................... | 174/45 R X |
| 3,369,788 | 2/1968 | Eisele ........................ | 248/219.4 X |
| 3,468,571 | 9/1969 | Farmer ........................ | 174/45 R X |
| 3,497,171 | 2/1970 | Farmer et al. ................ | 174/149 R X |
| 3,653,622 | 4/1972 | Farmer ........................ | 174/45 R X |
| 3,704,001 | 11/1972 | Sloop .......................... | 248/219.4 |
| 3,856,250 | 12/1974 | Farmer ........................ | 248/219.4 X |

FOREIGN PATENT DOCUMENTS 532,919  2/1941  United Kingdom ..................... 174/44

Primary Examiner—Laramie E. Askin
Attorney, Agent, or Firm—Paul M. Denk

[57] ABSTRACT

A bracket for supporting electrical components that accommodate the transmission of three-phase electrical energy. The bracket includes a crossarm, generally of linear design, and formed of electrically conductive tubular material for allowing its supplemental use as a bus bar for grounding of the various electrical components mounted thereon. A series of angle members having flanges that are arranged either horizontally or vertically disposed with respect to a surface of the crossarm, form mounting surfaces upon which either terminations, cutouts, or arrestors, or any combination of such, may be mounted all upon one level with respect to a utility pole. The supports that mount the crossarm to the utility pole are preferably electrically insulative, so as to enhance the protection of a lineman working in proximity to the crossarm. To further enhance the mounting of cutouts with respect to the crossarm, a modification in the invention disposes a plate upon the upper surface of the crossarm, the plate normally being bilaterally symmetrical, and includes electrical power.

27 Claims, 19 Drawing Figures

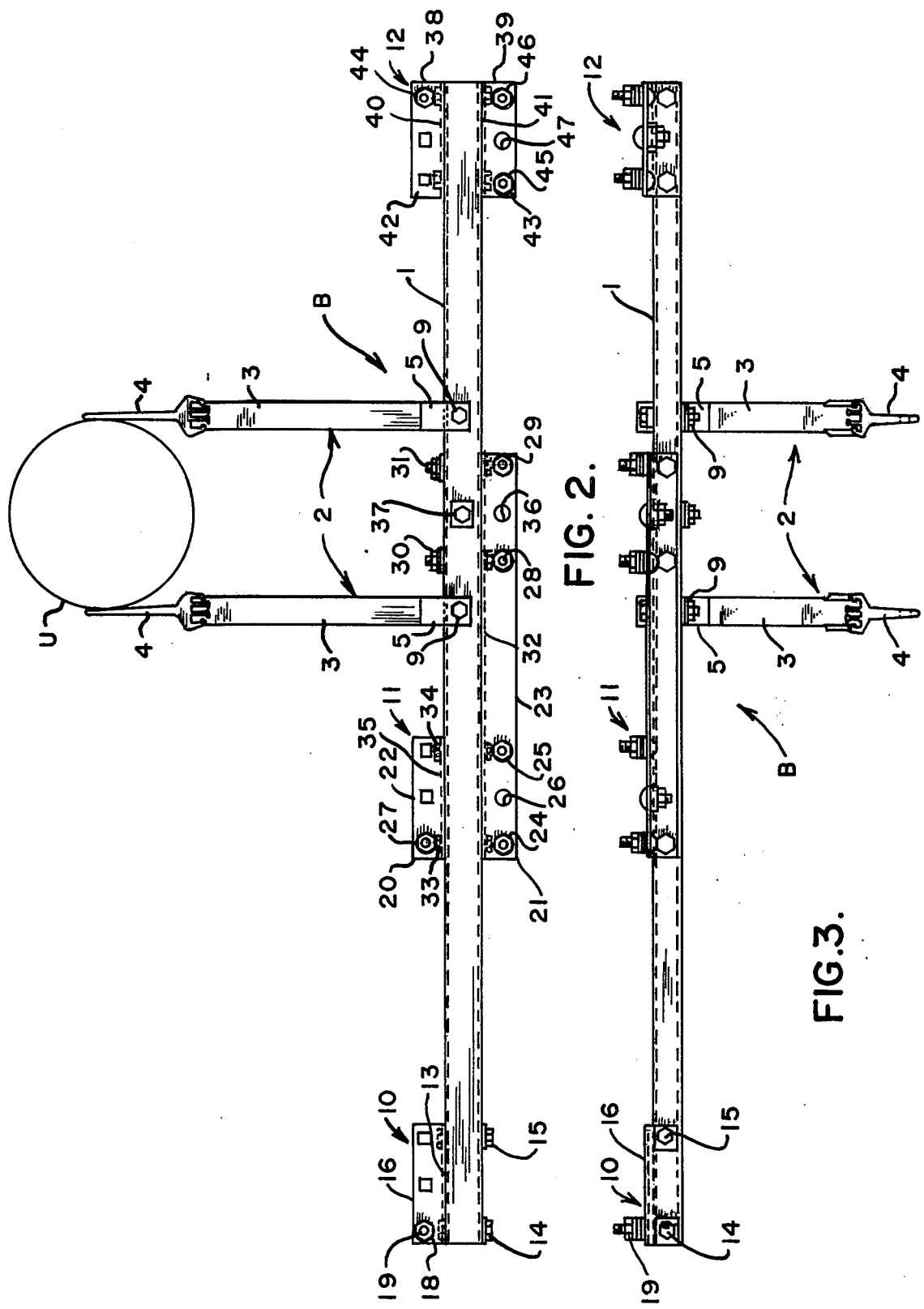

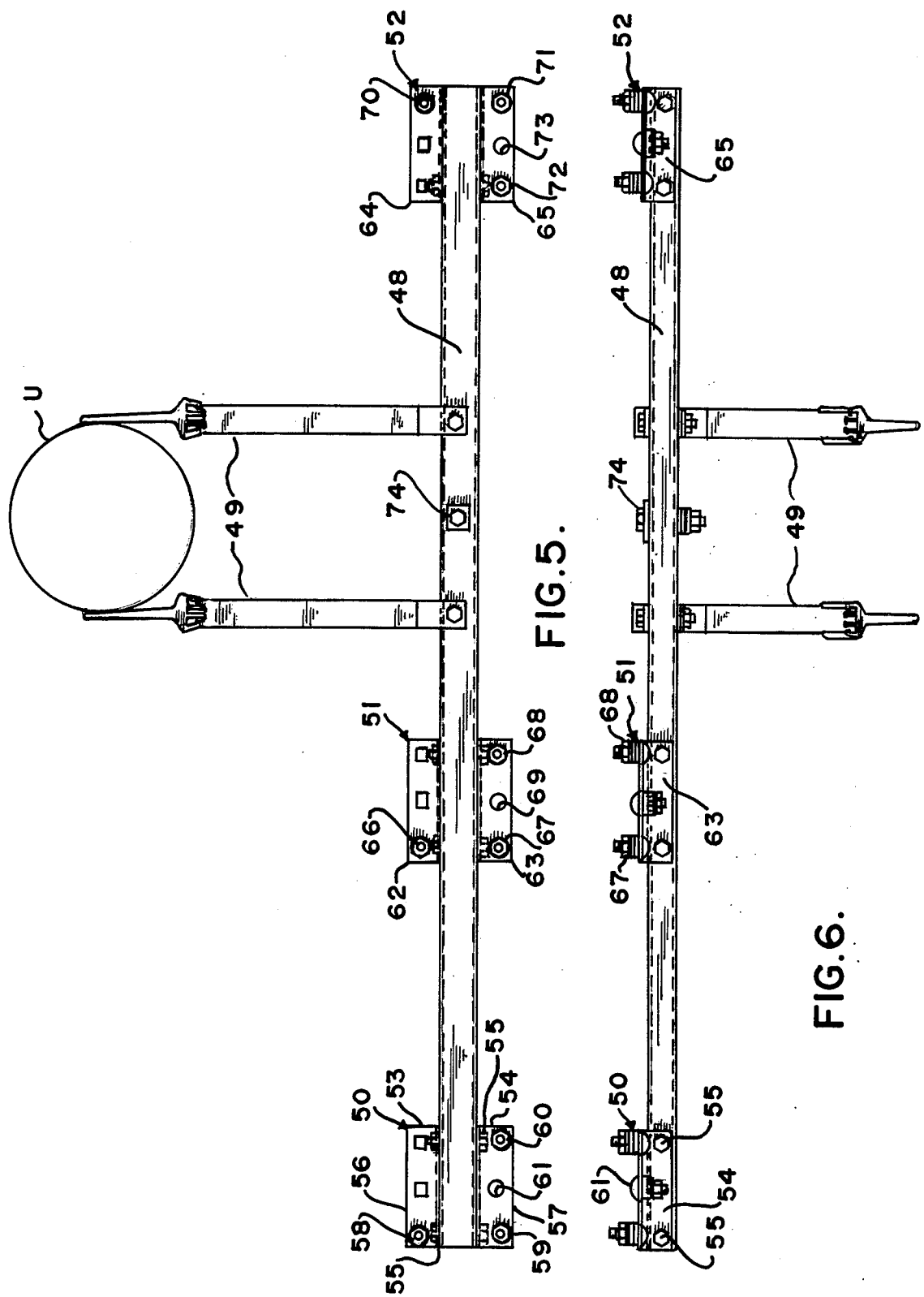

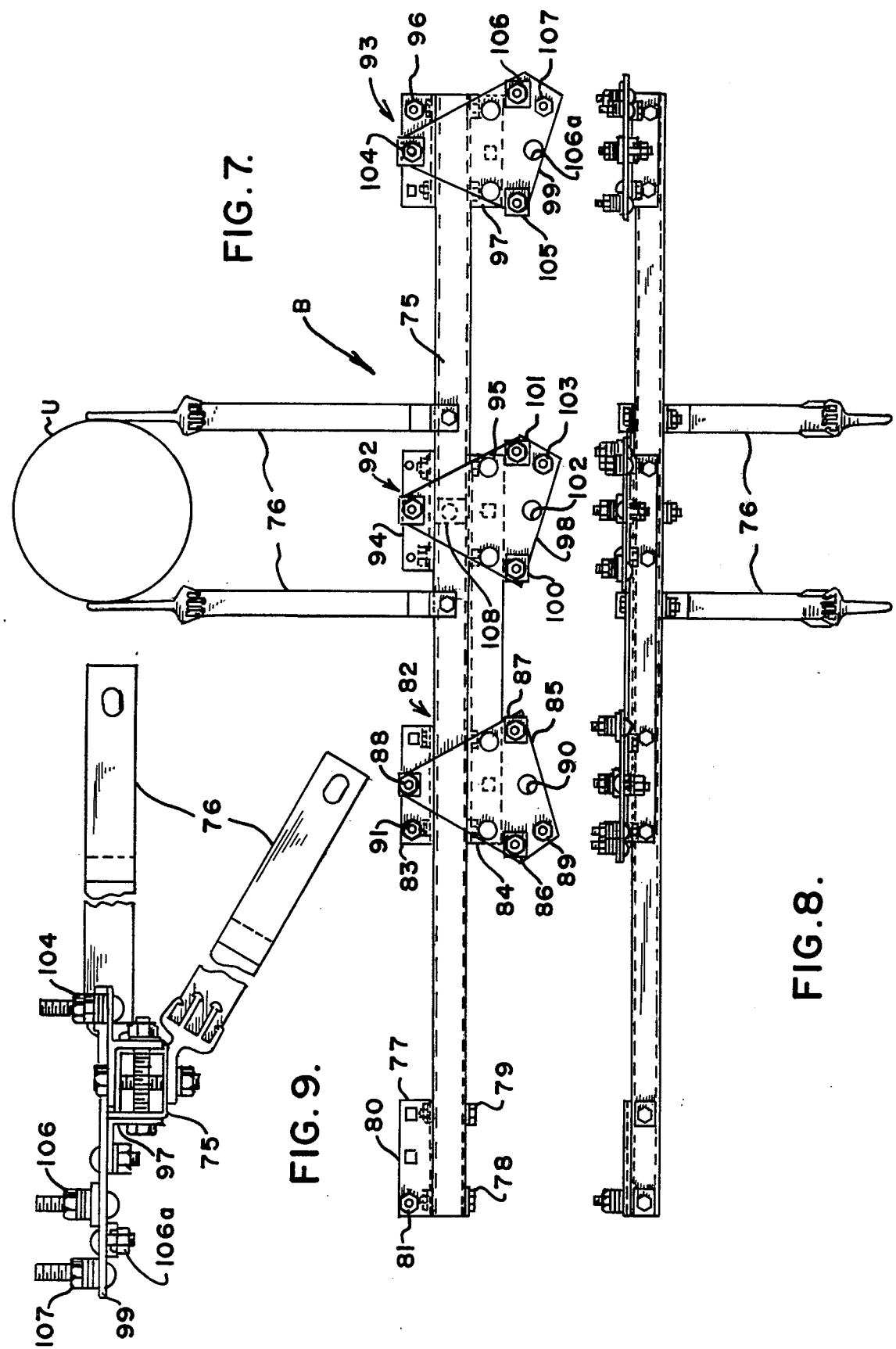

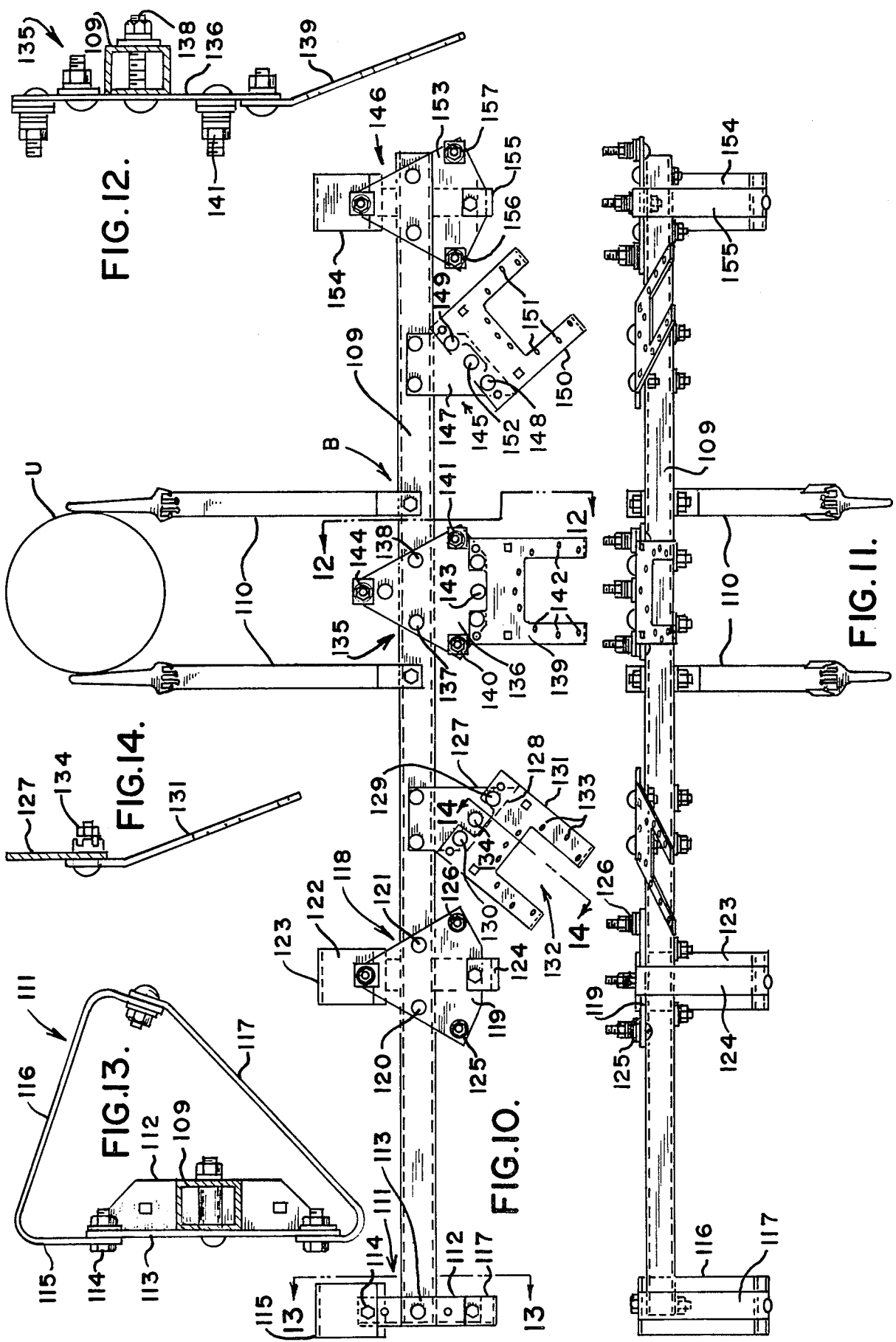

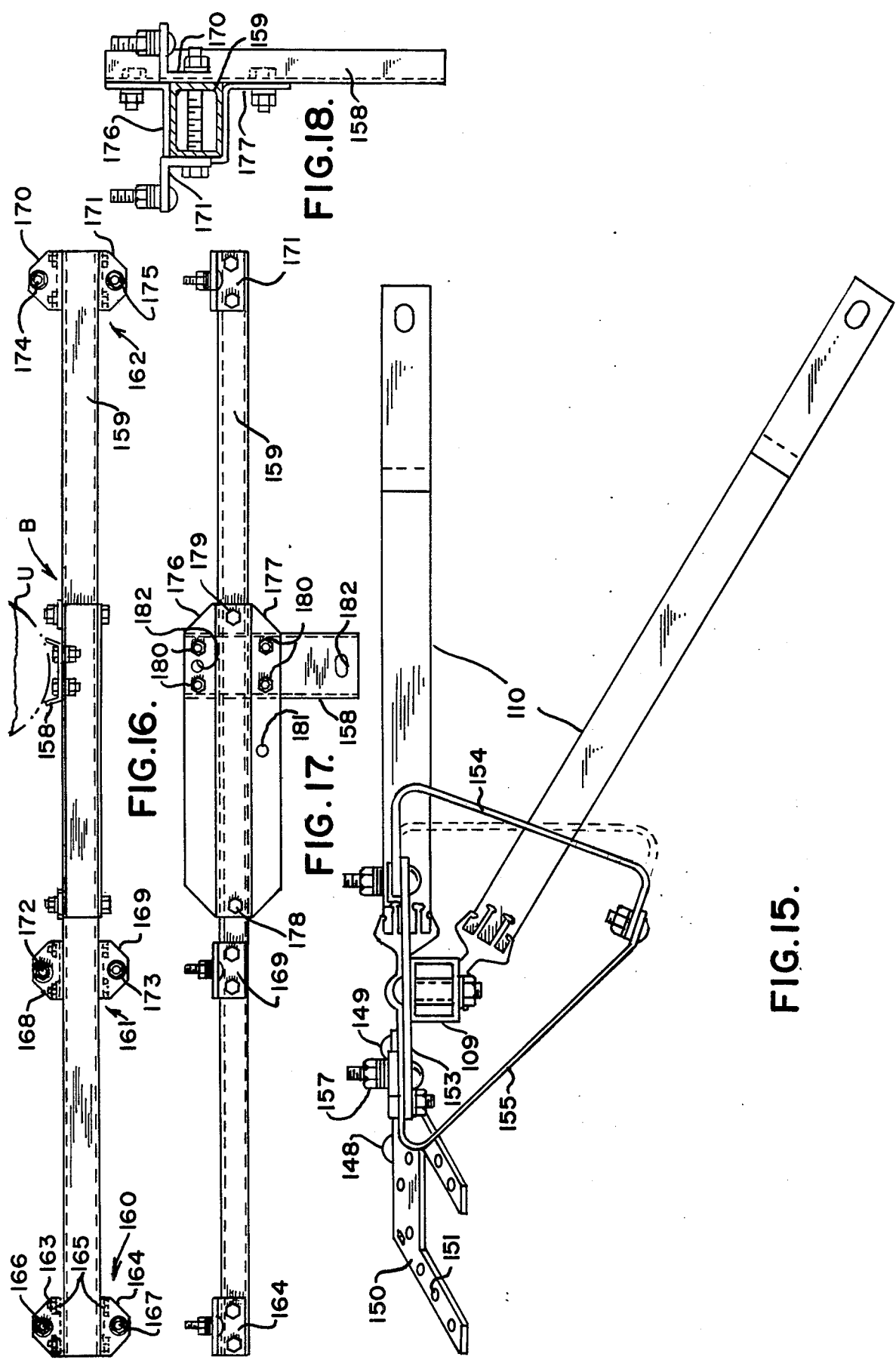

LEVEL MOUNT ELECTRICAL COMPONENT BRACKET

BACKGROUND OF THE INVENTION

This invention relates generally to means for mounting electrical components with respect to a utility pole, but more particularly, furnishes a bracket for mounting a series of cooperative electrical components all upon one level of a crossarm and which accommodates the transmission of three-phase charge.

Numerous styles of electrical component mounting crossarms are available in the prior art, but most of these crossarms are designed primarily for mounting of just a particular style or type of an individual electrical component. For example, in the earlier patent to the invention herein, U.S. Pat. No. 3,653,622, a crossarm for bracketing of electrical devices particularly in the style of transformers is disclosed, but the bracket as therein shown is primarily used for the mounting mainly of transformers, and sometime in association with arrestors, but such components are not mounted upon the same level. For example, as shown in the subject patent, the transformers may be connected to the frontal surface of the brackets as shown, but then any arrestors would be mounted upon the top side of the crossarm, therefore, placing the two components upon different levels in their mounting upon the bracket, and thereby making it difficult for the lineman to be able to manipulate the components at a single arm's reach.

Various other supports for electrical devices are shown in the prior art; and in the U.S. Pat. to Phillips, No. 2,990,151, there is disclosed a double crossarm primarily for use in mounting of heavy transformers. The U.S. Pat. to Aungst, No. 3,254,270, discloses a bracket for support of capacitors, but it can be seen that the terminal bushings or terminations are not upon the same level as the capacitors, or the switches, and therefore it does not provide level mounting of electrical components that can be worked upon by a lineman without having to shift himself vertically upon the utility pole. The U.S. Pat. to Taylor, No. 3,555,747, discloses a lightweight crossarm assembly, but it is of the type that would appear to mount only terminations, and not be able to accommodate a variety of electrical components, as also in the nature of arrestors and cutouts, as useful for accommodating the transmission of three-phase electrical energy. To provide for such would require the addition of other crossarms, at other levels on the pole, therefore consuming additional utility pole space and usage.

One of the problems associated with the prior type of corssarms as utilized for supporting the transmission of three-phase charge is that the various components would either be mounted at various levels are required to attain support for such components. Normally, the three-phase transmission of electrical energy includes the use of a termination, an arrestor, and also a cutout or hook disconnect switch, with a cluster of these three components being required for each phase of voltage being transmitted. Hence, prior crossarms would have a total of nine such electrical components mounted at various levels of the arm for supporting the same. And, the two tiers of crossarms as currently used, usually include the termination at the upper level, with the cutouts and arrestors being located upon a lower level crossarm. One of the reasons for this is that the ionization gases generated around the cutouts would normally contaminate the functioning of the arrestors and terminations that would normally be located thereabove, or in particular instances, therebelow. And, as a lineman would climb a pole to perform his duties upon these various electrical components, he would be required to work at one level upon the cutouts, and then rise to a different level to check the functioning of the various arrestors and terminations. Frequently, explosions would occur in the vicinity of these ionized gases, throwing pieces of fuse metal from the cutout in all directions and causing serious injury to a lineman.

The current invention is devised to provide a means for spacedly mounting these various electrical components for the three-phase conduct of charge, all upon a single level of a bracket, and properly and conveniently space the various components so as to provide for their distance insulation from each other, but at the same time, make the various components easily accessible to a lineman all at one level, and allow for his manipulation of the various components, and particularly the cutouts, without jeopardizing his safety through exposure to explosion, ionization gases, or any other type of charge pervading in the vicinity of the crossarm as frequently occurs, as aforesaid, with prior art types of related devices.

It is, therefore, the principal object of this invention to provide a single level bracket for mounting of the various components associated with the three-phase transmission of charge, all of said components being located on a unitary level for the convenience of maintenance and operation of such supported electrical components, and for enhanced safety.

Another object of this invention is to provide a bracket that functions as a grounding means for the various electrical components mounted upon it, thereby functioning in the nature of a bus bar to attain a source for grounding particularly of the arrestors mounted thereupon.

A further object of this invention is to provide the convenient arrangement of various mounting means, as in the nature of arranged angle members and particularly their flanges so as to furnish the full support for the variety of electrical components associated therewith for the conduction or tapping of three-phase charge.

A further object of this invention is to provide a mounting means associated with a bracket and which conveniently disposes the cutouts towards the associated utility pole and thereby furnishes quick access for the lineman to disconnect the electrical components and circuitry associated with any phase of the transmitted charge before servicing the installation.

These and other objects will become more apparent to those skilled in the art upon reviewing the summary of this invention, and upon undertaking a study of the description of its preferred embodiment in view of the associated drawings.

SUMMARY OF THE INVENTION

This invention contemplates the mounting of various electrical components upon a bracket, and all at the same level of disposition, so that the utility lineman may conveniently service the installation with a minimum of effort. The bracket preferably is of linear design, or may be even arcuately disposed for providing some curvature with respect to the utility pole supporting the same, with the crossarm of the bracket being formed preferably from a tubular member, or even a box channel design, that is formed from an electrically conductive material, such as aluminum, so as to allow its use as a bus bar for grounding of various of the components, particularly the lightning arrestors mounted thereon. The bracket is particularly designed for supporting those components useful for accepting energy from three-phase transmission lines, or double circuit transmission lines, with the series of components, normally comprising a combination of components, usually comprising a combination of a terminator, arrestor, and cutout or disconnect switch, each being affiliated with a phase of the charge being distributed, thereby normally requiring the support of at least nine components upon this bracket. To enhance the safety of usage of this bracket as mounted upon a pole, a support means in the nature of pairs of braces provide for the cantilevered suspension of the crossarm displaced from the utility pole, and the braces of this support may be formed of insulating material, such as wood, so as to prevent the conduct of any charge back to the utility pole, particularly in those instances where the pole itself may be formed of a conductive metal. Preferably these pairs of braces extend both horizontally and angularly from the utility pole, and while one pair of braces may be disposed in tension, the second pair of braces angulate downwardly to provide for a lower mount of the bracket to the pole, and they will be disposed in compression for providing stable support of the bracket, and particularly its crossarm, a convenient distance away from the utility pole.

The crossarm includes a series of mounting means thereon, generally arranged at three locations along its length, with each of the mounting means disposed for securement of the necessary electrical components thereon, and all at the same level, so as to form a means for distributing each phase of electrical charge from the transmission lines, but also to provide a convenient arrangement of each collection of such components, along the length of the crossarm, and, as previously stated, at the same heighth disposition for the convenience of the utility lineman.

Each mounting means normally includes a combination of pairs of angle members that have one of their flanges secured respectively usually to the front and back sides of the crossarm, with another flange of each angle member being disposed in a planar relationship generally aligned close to the upper surface of the crossarm so as to dispose a mounting surface to which the various components may be supported. And, in another embodiment, an additional pair of such angle members may be mounted so that their extending flanges are aligned vertically with respect to, preferably, the backside of the crossarm so as to form a mounting surface to which various components, such as a cutout or even grounding wires, may be connected to facilitate the functioning of the components secured to the bracket. In a further embodiment, a plate may be connected upon the upper surface of the flanges of the previously defined horizontally mounted type, and which plate is bilaterally symmetrical in disposition so as to accommodate the mounting of, particularly, an arrestor conveniently to either of its sides, as may be desired for the convenience of clustering of such components. And, the plate may include a series of apertures that are conveniently arranged in what is generally defined in the trade as a bolt circle type of pattern so as to allow the arrestor to be secured in the position of its initial installation to the various wiring of the transmission lines, without requiring the arrestor to be pivoted under such circumstances that may lead to a twisting of the connected wires, and which could eventually cause their fatigue and failure. In a further embodiment, another supplemental mounting means may be secured to the bracket and designed particularly for mounting of terminators thereon, and this type of mounting means includes a support that connects to the crossarm of the bracket, and further includes a flange that extends forwardly thereof, generally at an angle, and which flange is bifurcated so as to provide for the disposition of a terminator therein for its securement to this supplemental mounting means. This flange may be bent slightly at its forward position and level to allow for the connecting of wiring thereto, and in association with its paired disconnect switch and arrestor, generally recognizing that three groups of such components will be mounted along the length of the crossarm of the bracket since this invention has generally been designed for use in conjunction with three phase transmission and distribution of electrical energy. The bifurcated flange for mounting of terminations also includes a bolt circle pattern for the convenience of mounting of the termination in its arranged position without requiring any twisting or turning to attain its securement to the bracket. Hence, this invention is principally designed for providing the mounting of all of those electrical components necessary to attain distribution of three phase energy from transmission lines, and it conveniently disposes all these subordinate components in such a manner that they are readily within the reach of the lineman, as when he is required to service the same, but at the same time, includes the individual phase mounting means conveniently at those locations where each group of phase handling components are clustered. In addition, the grounding of the various components, such as the arrestors, can easily be made to the crossarm itself, since the crossarm is designed to function in the capacity of a conductive bus bar that furnishes uniform grounding of all of the various components to a single insulated ground that may be located within a polyvinyl chloride conduit, as so frequently used in the trade, and which then either extends upwardly or downwardly of the pole, as designed. And, as previously commented, the insulative braces supporting the crossarm, which may be a conductive bus bar, as just previously described, prevents the conduct of any charge, even grounded charge, to or through the utility pole itself.

BRIEF DESCRIPTION OF THE DRAWINGS

In the drawings, FIG. 1 discloses a perspective view of a utility pole having the three-phase electrical component mounting bracket of this invention shown secured to its upper end;

FIG. 2 provides a plan view of the bracket of this invention, with the various electrical components, as shown in FIG. 1, being removed for the convenience of sight;

FIG. 3 provides a front view of the bracket as shown in FIG. 2;

FIG. 5 provides a plan view of a modified form of three-phase bracket as previously disclosed in FIG. 2;

FIG. 6 provides a front view of the three-phase bracket as disclosed in FIG. 5;

FIG. 7 provides a modified form of three-phase bracket of this invention;

FIG. 8 provides a front view of the three-phase bracket as disclosed in FIG. 7;

FIG. 9 furnishes a side view of the three-phase bracket as disclosed in FIG. 8;

FIG. 10 discloses a plan view of a further modification in the three-phase bracket of this invention;

FIG. 11 provides a front view of the three-phase bracket as shown in FIG. 10;

FIG. 12 discloses a sectional view of the bracket and showing one of the mounting means that supports the various electrical components associated with one phase of the distributed charge, as taken along the line 12—12 of FIG. 10;

FIG. 13 discloses a modified form of mounting means associated with the bracket of this invention taken along the line 13—13 of FIG. 10;

FIG. 14 discloses a sectional view taken through a segment of one of the mounting means, taken along the line 14—14 of FIG. 10;

FIG. 15 shows a side view of the modified bracket as disclosed in FIG. 11;

FIG. 16 shows a plan view of a modified form of three-phase bracket in this invention;

FIG. 17 provides a front view of the bracket disclosed in FIG. 16;

FIG. 18 provides a side view of the bracket disclosed in FIG. 17; and

DESCRIPTION OF THE PREFERRED EMBODIMENT

Figure 1:
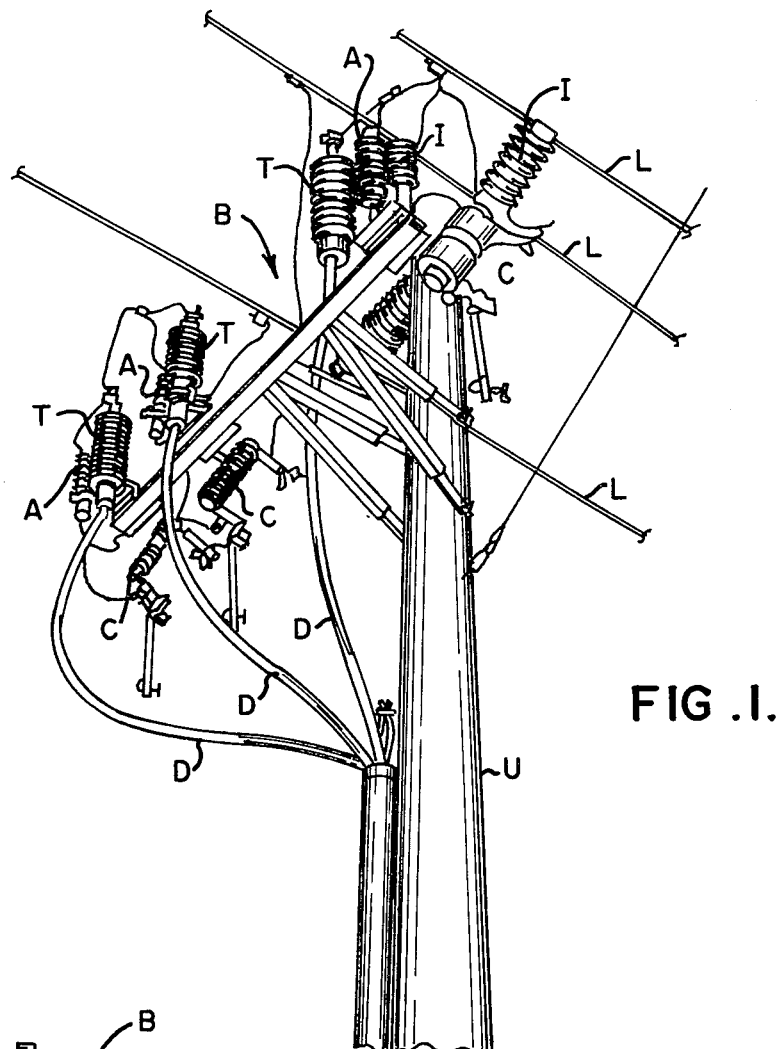

In referring to the drawings, and in particular FIG. 1, there is disclosed the bracket B of this invention as mounted upon a utility pole U, and of the type that carries a series of three transmission lines L, one each for carrying a particular phase of three phase electrical energy. Usually the utility pole of this type will include a series of insulators I that support the weight of the transmission lines, at three spaced locations at the top of the pole.

The bracket B of this invention is designed for mounting the variety of electrical components, as previously explained, that are useful for the distribution of three phase charge to a local source, generally tapping the individual phases of the energy for local transmission beneath the surface for underground distribution. As can be seen, there are three clusters of three electrical components usually associated with each phase of the charge, and each cluster includes a cutout, or disconnect switch C, a terminator T, and an arrestor, or lightning arrestor A, as shown. As is well known in three phase installation, the charge is tapped from a particular distribution line L, through a disconnect switch C, and then through a termination to the individual down lines D for underground distribution. The arrestor connects to the tap line that extends between the cutout C to the termination T so as to dampen the effects of any lightning that may strike the components at this location.

Usually, in the past, the mounting of clusters of components used in three phase distribution, as described with respect to FIG. 1, would be mounted upon a double tiered crossarm, with the cutouts or disconnect switches being located upon the lower crossarm, and perhaps having the arrestors located upon the same level, and with the terminations being attached to the top crossarm tier. Frequently, if not always, the disconnect switches would be secured to the frontal portion of the bottom tier of the crossarms, and when the lineman was required to service the components, he had to first mount the utility pole, attain the level of the disconnect switch, and then reach far around the front of the crossarm with a HOTSTICK for the purpose of disconnecting the switch, and all of its associated electrical components, from the system. The problem with this type of servicing is two-fold, first, in that the lineman had to rise up to a different level upon the pole to service the terminations, and perhaps arrestors, requiring his further movement upon the utility pole. Secondly, by having to reach around with a HOTSTICK to disconnect the switch, there would occasionally be experienced an explosion in the vicinity of the lineman's reach. Such an explosion normally causes a downwardly directed fireball that could cause serious injury, if not death, to the lineman, and even causing his fall to earth in the event that he was not utilizing a safety strap. Furthermore, the ionized gases around the cutout would contaminate the operations of the terminators and the arrestors. Hence, the current invention is designed, as can be seen from FIG. 1, to locate all of these components, at the same level upon a single crossarm of an electrical component bracket, so that the utility lineman can simply reach out with his HOTSTICK without entering into the zone of any ionized gases, and disconnect the switch C, wait a few moments for any gases to clear, and then simply reach out to service either the terminations, arrestors, or even the disconnect switch or cutout, as required. Furthermore, having the cutouts to the rear of the bracket segregates its gases from the other components.

Figure 4:
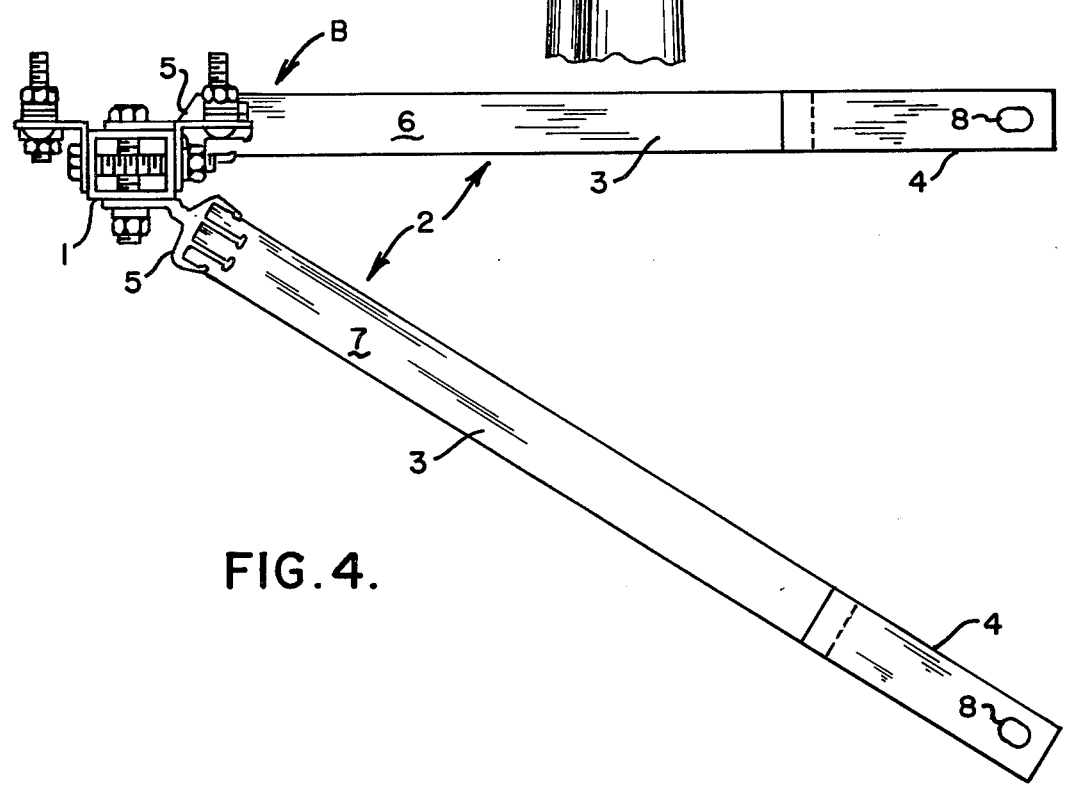
FIG. 4 provides a side view of the three-phase bracket as disclosed in FIG. 3.

The bracket B is shown in its structural arrangement in FIGS. 2 through 4. The bracket comprises a crossarm 1 formed generally of tubular stock, preferably a box channel, which extends some length to either side of the utility pole U. The crossarm is preferably formed of an electrical conductive material, generally aluminum, or related type materials, for the purpose of functioning as a bus bar providing for comprehensive grounding of the various components that require such to attain their effective operations.

The crossarm is held displaced from the utility pole by means of a series of supports 2, which supports are preferably insulative, being formed having a wood segment, as at 3, with attachment brackets 4 and 5 provided at their ends. These suports function as various braces for insuring the stable disposition of the crossarm 1 of the bracket B with respect to the utility pole, with the upper pair of braces, as delineated at 6, as in FIG. 4, functioning as tensioning braces and extending substantially horizontally from the utility pole to the bracket B, while the lower pair of braces 7 are angulated downwardly with respect to the bracket B and thereby function in the nature of compression braces for further stabilizing the bracket in place. Apertures 8 are provided through the attachment brackets 4 so as to accommodate the insertion of screws; and other fastening means 9 secure through the crossarm 1 for fastening the opposite attachment brackets 5 to the said crossarm during installation of the bracket B. In any event, the length of the supports 2 will not be greater than the reach of the lineman when he has climbed into proximity of all the electrical components as supported upon the bracket, as during a service call.

The mounting means secured to the crossarm and which provide the surfaces to which the various electrical components are attached are shown being located at three positions 10, 11 and 12, spaced along the length of the crossarm. Each position is designed for supporting the electrical components associated with various phases of the three-phase charge. These various mounting means are generally configured of similar type structure, and are basically formed from lengths of angle members.

The mounting means 10 includes a length of angle member which includes a pair of flanges, with the first flange 13 being secured with the backside of the crossarm by means of the fasteners 14 and 15. The other flange 16 of the angle is arranged in the vicinity of the upper surface of the crossarm 1, and extends rearwardly thereof. This flange includes a series of apertures, as at 18, that are designed for receiving fasteners therethrough, as one shown at 19, with the fastener 19 being provided for securement of a cutout, as used in cooperation of the A-phase of electrical energy distribution. The mounting means 11 includes a pair of angle members 20 and 21, with each angle member including a first flange that secures to the opposite sides of the crossarm 1, and each having second flanges, as at 22 and 23, respectively, that extend rearwardly and forwardly proximate the upper surface of the crossarm 1. The fastening means 24 shown upon the angle member 21 is designed for accommodating the arrestor of the A-phase power, while the fastening means 25 is provided for attachment of a termination as used in conjunction with the A-phase power distribution. A fastener 26 is designed for accommodating any form of attaching means that may secure the various grounding wires from the A-phase components so that grounding is available through the angle member 21, and through the crossarm 1, which as previously described, functions in the nature of a bus bar. Obviously, the crossarm 1 is also grounded by means of connection of a master grounding cable (not shown) thereto.

The back angle member 20, and particularly its horizontally and rearwardly extending flange 22 is designed for accommodating the B-phase cutout as attached to the fastener 27. And, the flange 23 of the angle member 21 extends further across the front of the utility pole, and at this location includes a pair of fasteners, as at 28 and 29, with each of said fasteners designed for mounting of the B-phase arrestor, and the B-phase termination, respectively, to this angle member 21. The fasteners 30 and 31 secure the flange 32 to provide support for this proximate end of the angle member 21, while the fasteners 33 and 34 attach the flange 32 of the angle member 21, and the flange 35 of angle member 20, to opposite sides of the crossarm 1. Hence, both of the angle members 20 and 21 are firmly affixed to the crossarm, and the bracket generally, and in this manner can stably mount the variety of electrical components thereon as just previously reviewed. The fastener 36 is provided for attachment of the ground wires from the B-phase components, while the connector 37, provided through the crossarm 1, is designed for attachment of the aforesaid master grounding wire (not shown) that grounds the entire bracket, including its crossarm, as it acts in a capacity of a bus bar, to ground. At the opposite end of the bracket is the mounting means 12, as previously identified, and this particular means also includes a pair of angle members 38 and 39, having their flanges 40 and 41 secured to opposite sides of the crossarm 1, with the other flanges 42 and 43 extending in opposite directions, respectively, from the said opposite sides of the said crossarm. The fastener 44 is designed for securement of a cutout for the C-phase of power, while the fasteners 45 and 46 are provided upon the forwardly disposed flange 43 for securement of the termination and arrestor, respectively, also for the C-phase of power distribution. The fastener 47 is provided for securement of the grounding wire for the C-phase electrical components, as just analyzed.

Essentially, as previously summarized, the cutouts for the A, B and C phase power are mounted respectively to their lugs 19, 27, and 44, and all at the back side of the crossarm 1, while the terminations and arrestors are secured to equivalent fasteners provided upon the flanges extending frontally of the said crossarm. Hence, all of the electrical components are mounted upon a single bracket at the same level, with the cutouts being conveniently disposed rearwardly so that the lineman can fastly disconnect their switches, thereby allowing him to comfortably reach forwardly of the bracket to service any arrestors or terminations, or any other wires associated therewith.

The bracket disclosed in FIGS. 5 and 6 provides a slight modification upon the bracket as just previously analyzed, and includes a crossarm 48 that extends to either side of the utility pole U and being braced by means of the supports 49, of the type as that previously analyzed. In this particular illustration, there are a series of mounting means 50, 51, and 52 that are arranged nonsymmetrically along the length of the crossarm, but each mounting means is designed having a pair of angle members that can accommodate in clustered fashion each of the various electrical components generally required for the distribution of three-phase power. The mounting means 50 includes the pair of angle members 53 and 54, that are fastened to the crossarm by means of the fasteners 55, with each angle member having a flange 56 and 57 extending rearwardly and forwardly of opposite surfaces of the crossarm. But, preferably, these flanges are arranged somewhat in proximity with the upper surface of the said crossarm. A fastening means 58 is provided for accommodating the A-phase cutout, while the fastening means 59 secures the A-phase arrestor, and with the fastener 60 securing the A-phase termination. The fastener 61 is conveniently disposed for securement of the A-phase grounding wires thereto. The mounting means 51 and 52 are very similar in construction to the mounting means 50 as just previously analyzed, and include pairs of angle members 62 through 65 that are mounted to opposite sides of the crossarm 48. The mounting means 51 is provided for securement of a cutout, arrestor, and termination, to its fasteners 66, 67 and 68, respectively, with the fastener 69 designed for accommodating the connection of a grounding wire thereto. The mounting means 52 is disposed for securement of the C-phase cutout, arrestor, and termination to its respective fasteners 70, 71 and 72. The fastener 73 is designed for securement of the grounding wire for the C-phase components to the mounting means at this location. A fastener 74 provides for the connection of the master ground wire to the cross-arm 48, since the crossarm 48 functions in the nature of a bus bar for providing a grounding of the charge from all of the various three-phase components that may be mounted upon a bracket during usage.

FIGS. 7 through 9 disclose a variation upon the bracket B that may yet function similarly to the brackets as previously analyzed while providing a level mount for all of the electrical components associated with the distribution of three-phase power. And, this bracket is specifically designed including the bolt circle type of flange arrangement, as will be hereinafter described, having particular utility for mounting the intermediate type arrestors. The bracket includes a crossarm 75, which may be formed of conductive material, for the purpose of also functioning as a grounding bus bar. The crossarm is secured to the utility pole U by means of the supports 76, which are formed as the type of insulated supports as previously analyzed in this disclosure. Preferably these supports are partially formed of insulating material, such as wood, or a polymer, so as to prevent the conduction of any charge to the utility pole, in the event of any electrical mishap or in the event lightning should strike one of the components mounted upon the said crossarm 75.

The crossarm 75 includes an angle member 77 secured by means of the fasteners 78 and 79 to the backside of the same, and a flange 80 extends rearwardly of the arm for mounting, for example, an A-phase cutout through the agency of its fastener 81. The mounting means 82 includes a pair of angle members 83 and 84 securing, respectively, to opposite sides of the crossarm 75, and includes a plate 85 that mounts to the upper flanges of said angle members, with said plate having a portion that extends rearwardly, and a portion that extends forwardly, of the crossarm, as shown. The advantage through the use of this style of plate forms what is defined as a bolt circle type of arrangement for securement of the A-phase arrestor at various locations around its periphery, depending upon the position desired. For example, the arrestor may have been previously wired to the termination, or other components, and to prevent a twisting or turning of its wiring during mounting of the said arrestor, it may be fixed to the plate in its arranged position and have a stress free location where it can be most easily secured to the bracket. Hence, a series of fasteners 86, 87 and 88 are arranged equally radially disposed from the center of the plate so that the intermediate arrestor, as for the A-phase of power distribution, may be connected to one of the same. The plate further furnishes means for connection of a fastener 89 for securement of the A-phase termination thereto, and the fastener 90 will accommodate the fastening of the A-phase grounding wires to the plate, and conductively to the bus bar functioning crossarm. At the same time, the angle member 83 includs a fastener 91 to which the B-phase cutout may be secured during installation.

The mounting means 92 and 93 are similar in design to the mounting means 82, with each including a pair of angle members, as at 94, 95, 96, and 97, said angle members being mounted to opposite sides of the crossarm 75 as shown, by the various fastener means. And, secured upon the extending flanges of each angle member are the plates 98 and 99, similar in construction but reversely mounted when compared with the previously explained plate 85. The intermediate arrestor for the B-phase power may be secured at any one of the bolt circle fasteners 100 or 101, with respect to the plate 98. And, the B-phase grounding wire may be secured to the fastener 102. In addition, the B-phase termination may be secured by the fastener 103 to the plate 98.

The C-phase cutout is secured by means of the fastener 104 to the backside of the plate 99, thereby disposing this cutout conveniently for manipulation by the lineman. The C-phase arrestor may connect to either of the fasteners 105 or 106, provided at the front segment of the plate 99, while the ground wire for the C-phase operation may connect by means of a fastener 106a proximate to the front edge of said plate 99. The C-phase termination may connect by means of its fastener 107 to the frontal portion of this plate 99. Hence, once again, all of the electrical components associated with and required for the operations of the various phases of the three-phase distribution are secured at the same level by means of the structure of this bracket B, while its cutouts are conveniently disposed rearwardly of this crossarm 75, and within easy and safe reach of a lineman.

A grounding lug 108 is provided upon the crossarm 75 for connection of the main grounding wire to the bracket so that its crossarm may function in the nature of a bus bar and provide for grounding of all the components mounted upon the same.

Another style of modified bracket used for the purpose of achieving the principles of this invention is shown in FIGS. 10 through 15. The bracket B incorporates its crossarm 109 that is secured by means of the preferably insulative supports 110 to the utility pole U. This particular bracket is once again designed for providing a level mount for all the components associated with and required for the distribution of three-phase power.

The crossarm 109 incorporates at one end a first mounting means 111 that is designed for securing a hook disconnect switch (not shown) for the A-phase of the electrical power. This mounting means includes a length of angle member 112 that has its upper flange 113 secured to the top side of the crossarm 109, and connecting to its back end by means of the fastener 114 is a member 115 that is bent to form a surface 116 to which the disconnect switch for the A-phase distribution may be secured. A bracing member 117 connects at one end to the lower bent end of the surface 116, while the upper end of this bracing member is secured to the front side of the angle 112. Hence, an enclosed frame is formed that is both rigidly secured to this proximate end of the crossarm, and conveniently has disposed a surface 116 for securement of a switch to the bracket to function in conjunction with one phase of the power distribution. Another mounting means 118 is disposed inwardly from the previously defined mounting means 111, and this particular mounting means includes a plate 119 that is bilaterally symmetrical in its shape, and which is secured by means of the fasteners 120 and 121 to the top side of the crossarm 109. To the back end of the plate is connected a mounting member 122 that includes a mounting surface 123, similar to the surface 116 previously analyzed, and to which the B-phase hook disconnect switch (not shown) may be secured. A bracing member 124 is secured to the bottom end of the surface 123, while at its top edge is connected to the frontal portion of the plate 119. The A-phase arrestor may be secured to either of the fasteners 125 or 126.

Extending forwardly from the crossarm 109 is a support member 127 which has a beveled edge 128 at its front, and secured by means of the fasteners 129 and 130 to this front edge of the support member is a flange 131. This flange 131 is designed for mounting of the A-phase terminator, and it is angled towards the mounting member 118, and bent slightly downwardly, so as to provide proximity between the mounted A-phase terminator, and the A-phase arrestor as previously defined being mounted to the fastening means 125 or 126. For the convenience of mounting of a termination to this flange 131, it is bifurcated, as at 132, and includes a series of apertures, as at 133, in an arrangement of a circle, and at the position where the lug(s) of the termination may be located so as to provide at least one aperture 133 in proximity to where the location of the termination bolt is disposed for the convenience of its stress free mounting. A further fastener 134 is provided upon the support member 127 to which the grounding wires of the A-phase electrical components may be secured so as to furnish electrical contact through the member 127 and to the bus bar formed bracket 109.

The B-phase electrical components, with the exception of its disconnect switch, are secured to the bracket B through the agency of the mounting means 135. This mounting means includes a plate 136 that is secured by means of the fasteners 137 and 138 to the crossarm 109. At the frontal portion of the plate 136 is secured a flange 139. The B-phase arrestor may be secured to either of the fastening means 140 or 141, provided to either side of the bilaterally symmetrical plate 136, while the B-phase terminator may be secured to the bifurcated flange 139 by securing through any one of the various annularly arranged apertures 142. For the convenience of disposition of the terminator, the flange 139 is angled downwardly at the fastener 143, while the overall ground wire for the entire bracket may be secured to the fastener 144 provided at the back end of the plate 136. It is to be noted that the bifurcated plate 139, just as the bifurcated plate 131, is bent or angulated slightly downwardly, as previously stated, as can be seen in FIG. 12, and the reason for this is to provide for a convenient disposition of the upward segment of the terminators mounted to these flanges, and to provide for their level proximity with their respective arrestors secured at one of the two locations of the previously defined plates.

Connecting to the other end of the crossarm 109 of the bracket B are the mounting means 145 and 146 that support the various electrical components associated with the operations of the C-phase of the three-phase distributing system. The mounting means 145 is similar in construction to the flange 131 previously described, except that it is angulated in an opposite direction, but includes a support 147 that is secured to the upper surface of the crossarm 109, and has fastened to its beveled forwardmost end by means of the fasteners 148 and 149, the bifurcated flange 150. This flange includes a series of apertures 151 arranged on a bolt circle configuration, for the convenience of connection of the C-phase terminations thereto. This flange also is partially angulated downwardly for the convenience of location of the upper end of the terminator mounted thereon. In addition, a fastener 152 is arranged for securement of the C-phase ground wire for grounding of any charge through the bus bar functioning crossarm. The mounting means 146 includes the bilaterally symmetrical plate 153 that has connected to its back end the mounting surface 154 and to which the C-phase disconnect switch may be secured. As can be seen, this surface 154 is reversible so as to provide either a straight or angulated disposition for the said cutout. A bracing member 155 secures the lower end of the mounting surface 154 to the forward end of the plate 153. The C-phase arrestor may be secured to either one of the fasteners 156 or 157 provided to either side of the plate 153. Hence, once again, all of the electrical components utilized in the distribution of three-phase power may be secured all upon a single level, with its disconnect switches being rearwardly disposed for the convenience of their disconnection by the lineman, while the other components including the terminations, arrestors, and grounding lugs, or their connected wiring, may be conveniently within reach for ease of servicing by the lineman.

A further modification to the component bracket of this invention is disclosed in FIGS. 16 and 17. The bracket B, as shown, is secured by means of a support means 158 to the utility pole U. It may be commented herein that the particular style of support means 158 shown comprises a length of channel, which is not necessarily formed of insulating material such as the previously analyzed support means, and in certain instances, wherein insulated supports may not be required by state regulations, this type of support means, or any other form of support means available in the art, and which may not be formed of insulating material, may be utilized for mounting any of the brackets previously shown and analyzed in this disclosure. This particular bracket B is of more simplified structure, and is designed primarily for the mounting of the cutouts and arrestors that are utilized in conjunction with the distribution of the three-phase power. As can be seen, the bracket includes a crossarm 159, which may be of tubular stock, and is formed having a series of aligned angle members that form the mounting means 160, 161, and 162 of this particular bracket. Each mounting means includes a pair of angle members such as the angle members 163 and 164 associated with the mounting means 160, with said angle members having one flange each connecting to the front and back sides of the crossarm 159 by means of the fasteners 165. The other flanges of the angle members 163 and 164 extend forwardly and rearwardly of the bracket, with a cutout for the A-phase securing by means of the fastener 166, disposed to the back side of the crossarm 159, while an arrestor may be secured on the same level to the fastener 167 secured to the flange extending to the front side of the crossarm 159. And, the A-phase ground wire may also be secured to the fastener 167 so as to provide for a grounding through the crossarm 159, which may function in the capacity as a bus bar, as previously analyzed. All of the electrical components mounting upon the means 160 comprise the A-phase components, while the B-phase electrical components will be secured to the angle members 168 and 169 of the mounting means 161, while the C-phase components will be secured to the angle members 170 and 171 of the mounting means 162. The B-phase cutout will be secured by means of the fastener 172 to the angle member 168, while the arrestor and ground wire for the B-phase may be secured by means of the fastener 173 to the angle member 169. Likewise, the C-phase cutout may be secured by means of the fastener 174 to the angle member 170, while the C-phase ground wire and arrestor may be secured by means of a fastener 175 to the angle member 171 of this mounting means. A further series of angle members 176 and 177 are secured in alignment by means of the fasteners 178 and 179 to the crossarm, and said angle members are also secured by means of a series of fasteners 180 to the support means 158. Bracket grounding may be attained by securement of the major ground wire for the utility pole to any fasteners 181 securing to either the angle member 176, or the angle member 177, as shown. The support means 158 is provided with the slots 182 therethrough, and through which fasteners may secure the entire bracket B to the utility pole U.

Figure 19:
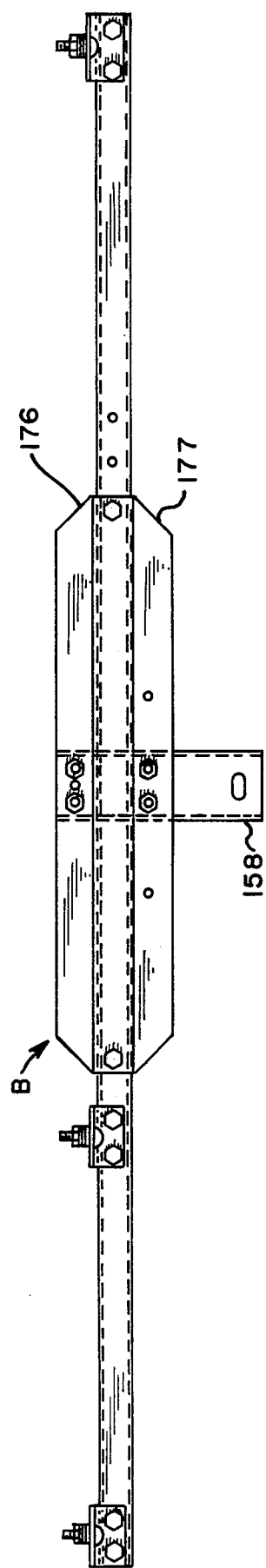
FIG. 19 provides a front view of a slightly modified type three-phase bracket as shown in FIG. 16.

FIG. 19 discloses a very slight modification upon the syle of bracket B previously shown in FIGS. 16 and 17, and this bracket is identical in formation with the exception that the angle members 176 and 177 are lengthened, so as to provide for their symmetry with respect to the support means 158, and thereby provide for uniformity of appearance of the bracket B when mounted upon a utility pole.

Variations or modification in the syle of bracket formations shown in this disclosure may occur to those skilled in the art upon reviewing the subject matter herein. Any such modifications or revisions, if within the spirit and scope of this invention, and encompassed by the claims appended hereto, are intended to be protected by any United States patent issuing upon this invention. The specific structural arrangements for the various brackets shown herein are set forth for illustrative purposes only.

Having thus described the invention, what is claimed and desired to be secured by Letters Patent is:

1. A three phase bracket for mounting electrical components in the category of terminations, cutouts, arrestors, or the like, all at the same level upon a utility pole, comprising a crossarm capable of attachment forwardly of a pole and capable of extending some distance laterally to either of its sides, insulative supports secured at one end with the crossarm and capable of attaching with a pole at their other ends, said supports comprising pairs of braces with one pair of said braces arranged as tensioned braces extending approximately forwardly horizontally from the crossarm, with the other pair of said braces being arranged as compression braces and extending downwardly at an angle with respect to the said crossarm, a series of mounting means secured with the crossarm, each mounting means comprising at least one angle member having a pair of flanges, one flange connected to a side of the crossarm, the other flange extending from the crossarm, each extending flange of the series of mounting means being arranged on the same horizontal plane to provide for a level disposition of any electrical component mounted upon the said bracket.

2. The invention of claim 1 wherein said crossarm comprises a tubular member.

3. The invention of claim 2 wherein said crossarm comprises a box channel.

4. The invention of claim 2 wherein said braces are formed of electrically insulative material.

5. The invention of claim 4 wherein the insulative material is wood.

6. The invention of claim 2 wherein each mounting means comprises a pair of aligned angle members arranged to opposite sides of the crossarm, one flange from each angle member extending from a side of the crossarm having a corresponding flange aligned therewith and extending from the other side of the said crossarm.

7. The invention of claim 6 wherein said bracket is formed for three-phase installation of electrical components in the category of an arrestor, termination and cutout, one extending flange from one side of the crossarm provided for supporting an arrestor and termination for each phase, and the corresponding flange extending from the other side of said crossarm provided for supporting a cutout for the same phase, the mounting of all of said electrical components for each phase being provided at the same horizontal level through the agency of said extending flanges of the pair of angle members forming each said mounting means.

8. The invention of claim 7 wherein each extending flange includes means for grounding of its mounted electrical components.

9. The invention of claim 8 wherein said crossarm is formed from a conductive material and functions as a bus bar for accommodating the grounding of the electrical components mounted thereupon.

10. The invention of claim 9 wherein said crossarm and mounting means are formed of aluminum.

11. The invention of claim 7 and wherein certain of said flanges extending from one side of the crossarm have a corresponding flange aligned with and extending from the opposite side of the crossarm, and a plate secured upon said aligned extending flanges, said plate extending both forwardly and rearwardly of the crossarm and being arranged for mounting of electrical components thereupon.

12. The invention of claim 11 wherein said arrestor and termination are capable of mounting to that portion of the plate extending forwardly of the crossarm, and the cutout is capable of mounting to that portion of the plate extending rearwardly of the crossarm.

13. The invention of claim 12 wherein said plate includes a series of apertures therethrough, said apertures being arranged at predetermined distances from the center of said plate to accommodate the mounting of an arrestor thereto.

14. The invention of claim 13 wherein said series of apertures are located at the same radial distance from the center of said plate.

15. The invention of claim 12 wherein said plate is disposed above the crossarm.

16. A three-phase bracket for mounting electrical components in the category of terminations, cutouts, arrestors, or the like, all on a single level upon a utility pole, comprising a lineal crossarm capable of attachment forwardly of a pole and capable of extending some distance laterally to either side of the same, insulative supports secured at one of their ends with the crossarm and capable of attaching with a utility pole at their other ends, said supports comprising pairs of braces with one pair of said braces being arranged as tensioned braces and extending forwardly from the crossarm, while the other pair of said braces are arranged as compression braces and extend downwardly at an angular disposition with respect to said crossarm, a series of mounting means secured with the crossarm, each mounting means including a plate secured upon the crossarm, said plate having lateral extensions to accommodate the connection of an arrestor thereto, a mounting surface being relatively flat for holding an electrical component and connected to the back edge of said plate, said surface extending substantially downwardly therefrom, and a bracing member connecting the downward portion of the said mounting surface to the front edge of said plate.

17. The invention of claim 16 wherein each plate of the mounting means is bilaterally symmetrical, and capable of mounting an electrical component proximate its sides.

18. The invention of claim 16 and including a series of supplemental mounting means secured to said crossarm, each supplemental mounting means including a support connected to the crossarm, a flange secured to the said support, said flange being bifurcated and disposed for mounting of a termination upon the bracket.

19. The invention of claim 18 wherein said supplemental mounting means are spaced equidistantly with respect to any utility pole upon which the bracket may mount.

20. The invention of claim 19 wherein said supplemental mounting means extends forwardly of the crossarm.

21. The invention of claim 20 wherein a portion of the flange of said supplemental mounting means is bent angularly downwardly.

22. The invention of claim 20 and including a series of apertures provided through the said bifurcated flange for accommodating the mounting of a termination thereto.

23. The invention of claim 16 wherein said crossarm is formed of conductive material and functions as a bus bar for attaining a grounding of any mounted electrical components.

24. The invention of claim 23 wherein said conductive material is aluminum.

25. The invention of claim 16 wherein said mounting surface is reversible in the mounting means for varying the angular disposition of the electrical component to be supported.

26. A three-phase bracket for mounting electrical components in the category of cutouts, arrestors, or the like, at the same level upon a utility pole, comprising a crossarm capable of attachment to a pole and capable of extending some distance laterally to either side of the same, support means connected to said crossarm and capable of attaching said bracket to a pole, a series of mounting means secured with the crossarm, said mounting means comprising a series of pairs of angle members, each angle member of a pair having a pair of flanges, one flange connected to a side of the crossarm, the other flange extending from the crossarm, each extending flange of a pair of angle members being aligned perpendicularly of the crossarm, each extending flange of the mounting means being arranged on the same horizontal plane to provide for the level disposition of electrical components upon the bracket, vertically disposed mounting means provided upon said crossarm, said vertically disposed mounting means comprising a pair of angle members, each angle member of said pair having a pair of flanges, one flange of each angle member connected to the upper and lower surfaces respectively of the crossarm, the other flange of each angle member being disposed vertically upwardly and downwardly respectively of the crossarm, the vertically disposed flanges being aligned to the backside of said crossarm and with each other, and said backside of the crossarm and the vertically disposed flanges being disposed for mounting of electrical components thereto.

27. The invention of claim 26 wherein said vertically disposed mounting means is symmetrically arranged with respect to the support means that is capable of attaching the bracket to a utility pole.

* * * * *